US012768850B2

(12) United States Patent
Miniaci et al.

(10) Patent No.: US 12,768,850 B2
(45) Date of Patent: Oct. 20, 2026

(54) LABORATORY AUTOMATION DEVICE WITH TRANSPARENT DISPLAY IN DOOR

(71) Applicant: TECAN TRADING AG, Männedorf (CH)

(72) Inventors: Ciro Miniaci, Zürich (CH); Maximilian Stiefel, Wädenswil (CH); Werner Hälg, Männedorf (CH); Ronan Leboudec, Zürich (CH)

(73) Assignee: TECAN TRADING AG, Männedorf (CH)

( * ) Notice: Subject to any disclaimer, the term of this patent is extended or adjusted under 35 U.S.C. 154(b) by 776 days.

(21) Appl. No.: 18/001,705

(22) PCT Filed: Jul. 8, 2020

(86) PCT No.: PCT/EP2020/069190
§ 371 (c)(1),
(2) Date: Dec. 13, 2022

(87) PCT Pub. No.: WO2022/008044
PCT Pub. Date: Jan. 13, 2022

(65) Prior Publication Data
US 2023/0228776 A1 Jul. 20, 2023

(51) Int. Cl.
*G01N 35/00* (2006.01)
*G06F 3/01* (2006.01)

(52) U.S. Cl.
CPC ....... *G01N 35/00722* (2013.01); *G06F 3/013* (2013.01); *G01N 2035/00306* (2013.01); *G01N 2035/00891* (2013.01)

(58) Field of Classification Search
None
See application file for complete search history.

(56) References Cited

U.S. PATENT DOCUMENTS 9,194,878 B2 11/2015 Oonuma et al.
9,989,946 B2 6/2018 Thieme et al.
(Continued)

FOREIGN PATENT DOCUMENTS

CN 104718456 A 6/2015
CN 106575450 A 4/2017
(Continued)

OTHER PUBLICATIONS

JP Office Action issued May 14, 2024 in corresponding Japanese Application No. 2023-500045, 6 pages, with English translation.
(Continued)

*Primary Examiner* — P. Kathryn Wright
(74) *Attorney, Agent, or Firm* — MH2 Technology Law Group LLP

(57) ABSTRACT

A laboratory automation device comprises a workspace with liquid containers and a pipetting arm for moving liquids between the liquid containers; a housing enclosing the workspace; a door of the housing for accessing the workspace, wherein the door comprises a transparent display for displaying information and for allowing a person to view into the workspace; and a tracking sensor for tracking an eye position of the person. The laboratory automation device is adapted for determining the eye position of the person from sensor data acquired with the tracking sensor; and for displaying information for a notification area in the workspace on the transparent display, such that the information is displayed from a perspective of the person in front of the notification area.

13 Claims, 4 Drawing Sheets

(56) References Cited

U.S. PATENT DOCUMENTS

| | | | |
|---|---|---|---|
| 10,192,365 B2 | 1/2019 | Siddiqui et al. | |
| 2005/0237343 A1* | 10/2005 | Kanda | B23Q 11/0891 345/633 |
| 2008/0297535 A1 | 12/2008 | Reinig | |
| 2012/0072873 A1 | 3/2012 | Park et al. | |
| 2012/0102438 A1 | 4/2012 | Robinson et al. | |
| 2013/0052927 A1* | 2/2013 | Broemsen | G03B 21/28 454/56 |
| 2013/0266952 A1 | 10/2013 | Goemann-Thoss et al. | |
| 2014/0028711 A1* | 1/2014 | Kincaid | G06F 3/013 345/633 |
| 2014/0327613 A1 | 11/2014 | Chessa et al. | |
| 2015/0105877 A1 | 4/2015 | Goemann-Thoss et al. | |
| 2016/0202757 A1 | 7/2016 | Miao et al. | |
| 2017/0269573 A1* | 9/2017 | Holzkämper | G05B 19/409 |
| 2018/0196540 A1* | 7/2018 | Bliss | G05B 23/0216 |
| 2019/0086296 A1 | 3/2019 | West | |
| 2019/0389069 A1* | 12/2019 | Kalbavi | B25J 9/0093 |
| 2020/0408792 A1* | 12/2020 | Kumagai | G01N 35/00722 |
| 2021/0181218 A1* | 6/2021 | Gisler | G01N 35/04 |
| 2022/0197578 A1* | 6/2022 | Kunert | B01L 3/50 |
| 2024/0046826 A1* | 2/2024 | Leadbetter | G06F 3/013 |

FOREIGN PATENT DOCUMENTS

| | | | | |
|---|---|---|---|---|
| CN | 108153502 A | 6/2018 | | |
| CN | 110769245 A | 2/2020 | | |
| EP | 2762889 A1 | 8/2014 | | |
| EP | 2907001 B1 | 12/2016 | | |
| EP | 3306373 A1 | 4/2018 | | |
| JP | 2013-072799 A | 4/2013 | | |
| JP | 2014-500132 A | 1/2014 | | |
| WO | WO-2019081351 A1 * | 5/2019 | | G01N 35/04 |

OTHER PUBLICATIONS

Reto, Davide (Authorized Officer), PCT International Search Report issued Oct. 5, 2021 in corresponding International Application No. PCT/EP2020/069190, 4 pages.

CN Office Action issued May 29, 2025 in corresponding Chinese Application No. 202080102118.9, 20 pages, with English translation.

* cited by examiner

LABORATORY AUTOMATION DEVICE WITH TRANSPARENT DISPLAY IN DOOR

CROSS-REFERENCE TO RELATED APPLICATIONS

The present application is the national stage entry of International Patent Application No. PCT/EP2020/069190, filed on Jul. 8, 2020, and published as WO 2022/008044 A1 on Jan. 13, 2022, the entire disclosure of which is incorporated by reference herein in its entirety.

FIELD OF THE INVENTION

The invention relates to a laboratory automation device. Furthermore, the invention relates to a method, a computer program. a computer-readable medium and a controller for operating a laboratory automation device.

BACKGROUND OF THE INVENTION

Laboratory automation devices are used for automating tasks of a laboratory assistant, which, for example, tests a patient for specific diseases. Usually, a sample of the patient's blood, urine, stool, etc. is taken and analysed by means of a bio-chemical procedure. Such a procedure consists in various operations like adding substances, incubating, separating, etc. and a measurement process which quantitatively or qualitatively measures the amount, presence or absence of a substance indicating the specific disease.

Specific laboratory automation devices comprise a workspace, which is enclosed by a housing with a door. Inside the housing, the reagents, which are accommodated in containers, may be processed with a pipetting arm, which may aspirate a liquid from one container and may dispense the liquid into another container. The door may be transparent, such that a person can view into the workspace, however, may shield unintentional access into the workspace.

A laboratory automation device may be connected with a controller, usually a PC, which, for example, performs the control of the pipetting arm. The state of various components inside the laboratory automation device and error messages may be displayed on a monitor of the PC. It may be that a schematic setup of the workspace based on graphical symbols is shown on the monitor. For checking the state of the laboratory automation device, a person has to look onto the monitor and has to identify, which component inside the workspace is related to the specific message and/or symbol on the monitor.

SUMMARY OF THE INVENTION

It is an object of the invention to simplify the supervising of a laboratory automation device.

This object is achieved by the subject-matter of the independent claims. Further exemplary embodiments are evident from the dependent claims and the following description.

A first aspect of the invention relates to a laboratory automation device. In general, a laboratory automation device may be any device adapted for automatically performing tasks of a laboratory assistant. At least such a laboratory automation device comprises a pipetting arm, which is adapted for moving a robot pipette between different positions and for aspirating and ejecting of liquid at these positions. Additionally or alternatively, such a laboratory automation device comprises at least a gripper arm, which is adapted for moving a robot gripper between different positions and for removing objects from or placing objects to these positions. The liquid may be aspirated from and ejected in cavities provided by liquid containers, which may be positioned on a worktable of the laboratory automation device. Such liquid containers may comprise at least one of a well, a sample tube, a microtiter plate and/or a reagent container, etc.

According to an embodiment of the invention, the laboratory automation device comprises a workspace with liquid containers and a pipetting arm for moving liquids between the liquid containers, a housing enclosing the workspace, a door of the housing for accessing the workspace, wherein the door comprises a transparent display for displaying information and for allowing a person to view into the workspace and a tracking sensor for tracking an eye position of the person.

With such an equipment, the laboratory automation device is adapted for directly displaying information on the door through which a person can view into the interior of the housing and in particular the workspace. Furthermore, the laboratory automation device is adapted for determining, towards which area inside the workspace the person is viewing. In such a way, the person can be optimally informed about procedures and errors inside the laboratory automation device.

The housing and the door may completely enclose the workspace. However, it also may be that solely access to the workspace from specific directions is restricted by the housing.

The transparent display may be an OLED or LCD display. Such types of displays may display information, texts and graphics on a transparent screen.

According to an embodiment of the invention, the laboratory automation device is adapted for: determining the eye position of the person from sensor data acquired with the tracking sensor; and displaying information for a notification area in the workspace on the transparent display, such that the information is displayed from a perspective of the person in front of the notification area. These steps may be controlled by a controller of the laboratory automation device, which may be a computing device and/or PC connected to the laboratory automation device. The controller may be an external device or may be included into the laboratory automation device and in particular into its housing. The pipetting arm, the tracking sensor and the transparent display may be connected for data communication with the controller.

The transparent display may be used for displaying an augmented reality application, which augments the workspace of the laboratory automation device. This augmented reality application may be executed in the controller. The perspective of the person may be defined by her or his eye position. From the eye position, it may be determined, which part of the transparent display is situated in front of the notification area. This part may define a display area, in which the information is displayed.

The information shown on the transparent display may be notifications and/or error messages related to specific objects/components in the workspace. The augmented reality application may display the information near and/or above the corresponding component, with respect to the eye position of the person.

The information may comprise a symbolic indicator, which may be colored and/or flashing. The indicator may be an outline of the notification area.

The eye position may be provided as three-dimensional coordinate with respect to a coordinate system defined by the laboratory automation device.

According to an embodiment of the invention, the notification area is projected towards the eye position onto the transparent display. With the projection, a display area on the transparent display is determined, in which display area the information should be displayed. It may be that the laboratory automation device and/or its controller has an internal model of the current setup of the workspace. In particular, positions and optional types of components inside the workspace may be stored in the internal model. Such components may include liquid containers, other types of containers, such as pipette tip containers, test samples, the pipetting arm, etc. It may be that outer three-dimensional shapes of the components are stored together with the components. Such a shape may be determined from the type of component.

An internal model of the workspace, which may comprise positions and/or extensions of components in the workspace, already may be present, since the laboratory automation device may have to determine movements of the pipetting arm and gripper between such components. Furthermore, such an internal model may be generated in the context worktable recognition, where the laboratory automation device determines the content of the workspace with a sensor.

This specific shape of the component or more general a box or other general shape at the position of the component may be projected towards the eye position of the person onto the transparent display. This determines a display area, which seen from the person's perspective, lies in front of the component. When the information is shown in this display area, it is directly related to the component.

According to an embodiment of the invention, the notification area is an area, in which a component of the laboratory automation device is situated. For example, the information, which is displayed on the transparent display, is a status information of the component. The information may indicate on refilling a container, that too few pipetting tips are present and/or that a liquid container has too low content of liquid. The status information may be an error message. The status information may be a request to interact with the respective component in the workspace. It may be that the component is removable and that the information indicates that the component has to be removed.

It may be that the workspace is monitored by a camera or more general a sensor. By evaluating the sensor data, it may be determined, whether components are at the right position or not. When a component is at the wrong place, a corresponding error message is generated.

According to an embodiment of the invention, the notification area is an area, in which a component of the laboratory automation device is to be placed. In general, the notification area also may be an empty space of the workspace. The information, which is displayed on the transparent display, may be a status information of a component to be placed in the notification area. The information may indicate that a liquid container has to be placed into this area.

According to an embodiment of the invention, the tracking sensor comprises one or more cameras. The eye position may be estimated from a video stream. For example, a position and/or size of the head of a person may be extracted by extracting the face of the person from the video stream.

According to an embodiment of the invention, the tracking sensor comprises an eye tracking sensor. Such a sensor may comprise an infrared camera and infrared light sources, which are reflected from the person's eyes. With an eye tracking sensor, the view direction and the eye position may be estimated more exactly as with solely a video stream.

According to an embodiment of the invention, the tracking sensor is adapted for determining that more than one person is in its sensing area. For example, the persons, who are situated in front of the door and/or who are looking through the door, may be determined from a video stream. Such a video stream may be provided by a camera of the tracking sensor.

According to an embodiment of the invention, the person, for who the eye position is determined, is selected via gesture detection performed with sensor data of the tracking sensor. The video stream of the camera also may be used for gesture detection. There may be a gesture, such as waving a hand, which indicates that the person doing the gesture is the person, for whom the eye position should be determined and/or for who the augmented reality should be generated.

It also may be that, when more than one person are detected by the tracking sensor, the information is displayed without augmented reality features.

According to an embodiment of the invention, the person, for who the eye position is determined, is selected via the transparent display. The transparent display also may comprise a touchscreen. The transparent display may display a picture of the user group, which may be taken by the camera. The picture of the person to who the augmented reality with correct perspective is displayed may be touched on the transparent display, for selecting the respective person.

According to an embodiment of the invention, the door has a position sensor for determining a position of the door. The door may be a slidable door or a hinged door. There may be the positions "closed", "work bench accessible" and "completely opened". The position sensor also may be used for stopping the pipetting arm, when the door is opened and/or moved into a specific position.

According to an embodiment of the invention, a display area on the transparent display, in which the information is displayed, is determined in dependence of the position of the door. There may be several positions of the door, in which the person may view through the door into the workspace.

With the position sensor, two or more positions of the door may be detected, such as opened and closed. A three-dimensional model of the door and/or the transparent display together with its position and/or orientation may be stored in the controller. This model may be used for determining the projection of the notification area onto the transparent display. With the position sensor and/or the detected position of the door, the position of the door additionally may be taken into account for determining the projection.

According to an embodiment of the invention, the transparent display comprises a touchscreen. As already mentioned, the transparent display also may be used as user interface.

A further aspect of the invention relates to a method for operating a laboratory automation device as described in the above and the below. The method may be performed by the controller.

According to an embodiment of the invention, the method comprises: determining the eye position of the person from sensor data acquired with the tracking sensor; and displaying information for a notification area in the workspace on the transparent display, such that the information is displayed for the person in front of the notification area. It has to be understood that features of the method as described in the above and in the following may be features of the laboratory automation device as described in the above and in the following.

A further aspect of the invention relates to a computer program for a controller of a laboratory automation device, which, when being executed by a processor, is adapted for performing the method as described above and below. A further aspect of the invention relates to computer-readable medium, in which such a computer program is stored. The controller of the laboratory automation device may comprise a processor, which executes the computer program, which may be stored in a memory of the controller.

A computer-readable medium may be a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the invention relates to a controller of a laboratory automation device (10) adapted for performing the method as described herein. The method may be implemented in hardware, such as an FPGA, at least partially.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
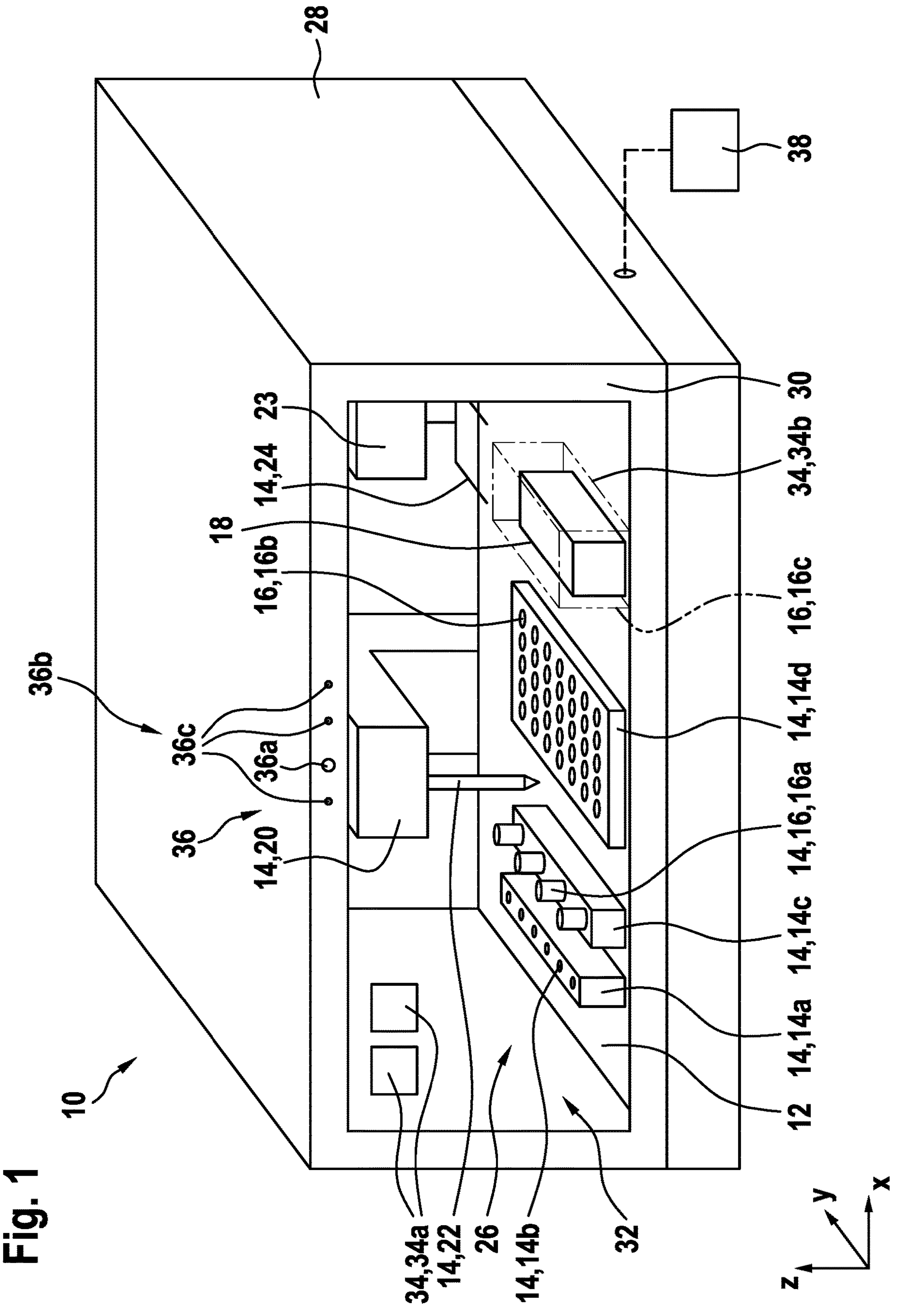
FIG. 1 shows a schematic perspective view of a laboratory automation device according to an embodiment of the invention.

FIG. 1 shows a laboratory automation device 10, which comprises a workbench 12 onto which several components 14 of the laboratory automation device 10 are mounted. The shown examples include a cartridge 14*a* with pipette tips 14*b*, a cartridge 14*c* with test tubes 16*a*, a microplate 14*d* with wells 16*b* and a container 16*c* containing a reagent 18. In general, some of the components 14 may be liquid containers 16.

The laboratory automation device 10 further comprises a pipetting arm 20 with a pipette 22, which may be moved in three dimensions, for example with the aid of motors. A sample may be pipetted with the pipette 22 from the test tubes 16*a*, by being aspirated and may be dispensed into a well 16*b*. Analogously, the reagent 18 may be conveyed into the well 16*b*. With a gripper arm 23 equipped with grippers 24, the microplate 14*d* may be exchanged and moved into further devices, such as a heater, an optical analysis device, etc.

The components 14, 20, 22, 24 of the laboratory automation device 10 are arranged in a workspace 26 above the workbench 12, which is enclosed by a housing 28. At a front side, the housing 28 has a door 30, which can be opened for accessing the components 14, 20, 22, 24. A part of the door 30 or the complete door 30 is a transparent display 32, allowing to view into the workspace 26 and on which information 34 can be displayed. Such information may include symbols, text and images 34*a* and an outlining and/or highlighting 34*b* from components 14, 20, 22, 24.

Some or all of the information 34 may be displayed with respect to a specific viewing perspective of a person in front of the laboratory automation device 10, such that the information 34 is displayed near or in front of a component 14, 20, 22, 24 for the person.

In general, the information 34 may contain stationary information 34*a*, which is displayed on the same position on the transparent display 32 independently from the eye position of a person (and optionally independently from a position of the door 30). Furthermore, information 34 may contain augmented reality information 34*b*, which is displayed on the transparent display 32 at a position in dependence from the eye position of the person (and optionally dependent on a position of the door 30).

For example, the outlining and/or highlighting 34*b* of a component 14, 20, 22, 24 may be displayed, such that it overlays the area at which the component 14, 20, 22, 24 is arranged in the workspace.

For determining the eye position, the laboratory automation device 10 comprises a tracking sensor 36, which comprises a camera 36*a* and/or an eye tracking sensor 36*b*. For example, besides a camera 36*a*, an eye tracking sensor may comprise one or more infrared light sources 36*c*. The tracking sensor 36 and in particular the camera 36*a* and the infrared light sources 36*c* may be attached to the housing 28.

FIG. 1 furthermore shows a controller 38 of the laboratory automation device 10, which may perform determining the eye position and rendering the information 34 to be displayed on the transparent display 32. The controller 38 may be a computer or embedded device in data communication with the laboratory automation device 10 or may be included into the laboratory automation device 10.

Figure 2:
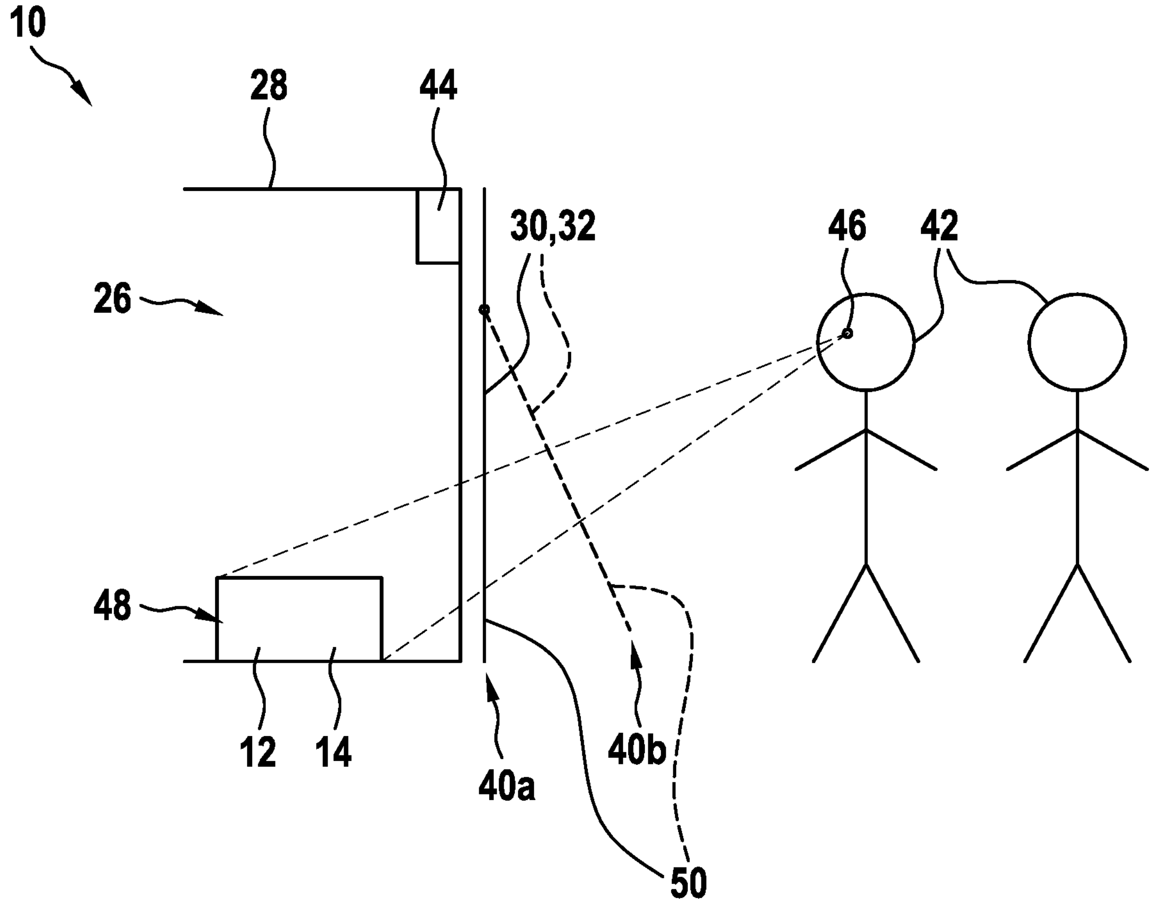
FIG. 2 shows a schematic cross-sectional view of a laboratory automation device according to a further embodiment of the invention.

FIG. 2 shows an embodiment of a laboratory automation device 10 with a hinged door 30. The door 30 of the laboratory automation device 10 of FIG. 1 may be designed in such a way. The door 30 may be hinged about an axis A. In a first position 40*a*, the door 30 is closed and the door 30 prevents, that the workspace 26 is accessible through the opening, which is closed by the door 30. In a second position 40*b*, the door 30 is opened, such that a person 42 may view through the transparent display and may reach into the workspace 26, for example for exchanging a liquid container 16. There may be a further position, in which the door 30 is completely opened. The positions 40*a*, 40*b* of the door are determined with a position sensor 44.

The position sensor 44 may be used by the controller 38, for stopping the operation of the pipetting arm 20 and/or of the gripper 24, when the door 30 is not completely closed, i.e. is not in the position 40*a*.

FIG. 2 also illustrates, how the controller 38 determines a display area 50 of the information 34*b*. With the known eye position 46, a notification area 48 in the workspace is projected onto the transparent display 32. This projection is used as the display area 40, in which the information 34*b* is displayed. The notification area 48 may be a volume in the workspace 26. The display area 40 may be a two-dimensional shape, such as a polygonal part of the display.

For performing the projection of a notification area 48, the controller 38 has to know the eye position 46 and the position of the transparent display 32. This position may be determined from the door position 40*a*, 40*b* or may be assumed to be constant.

Figures 3A, 3B, 3C:
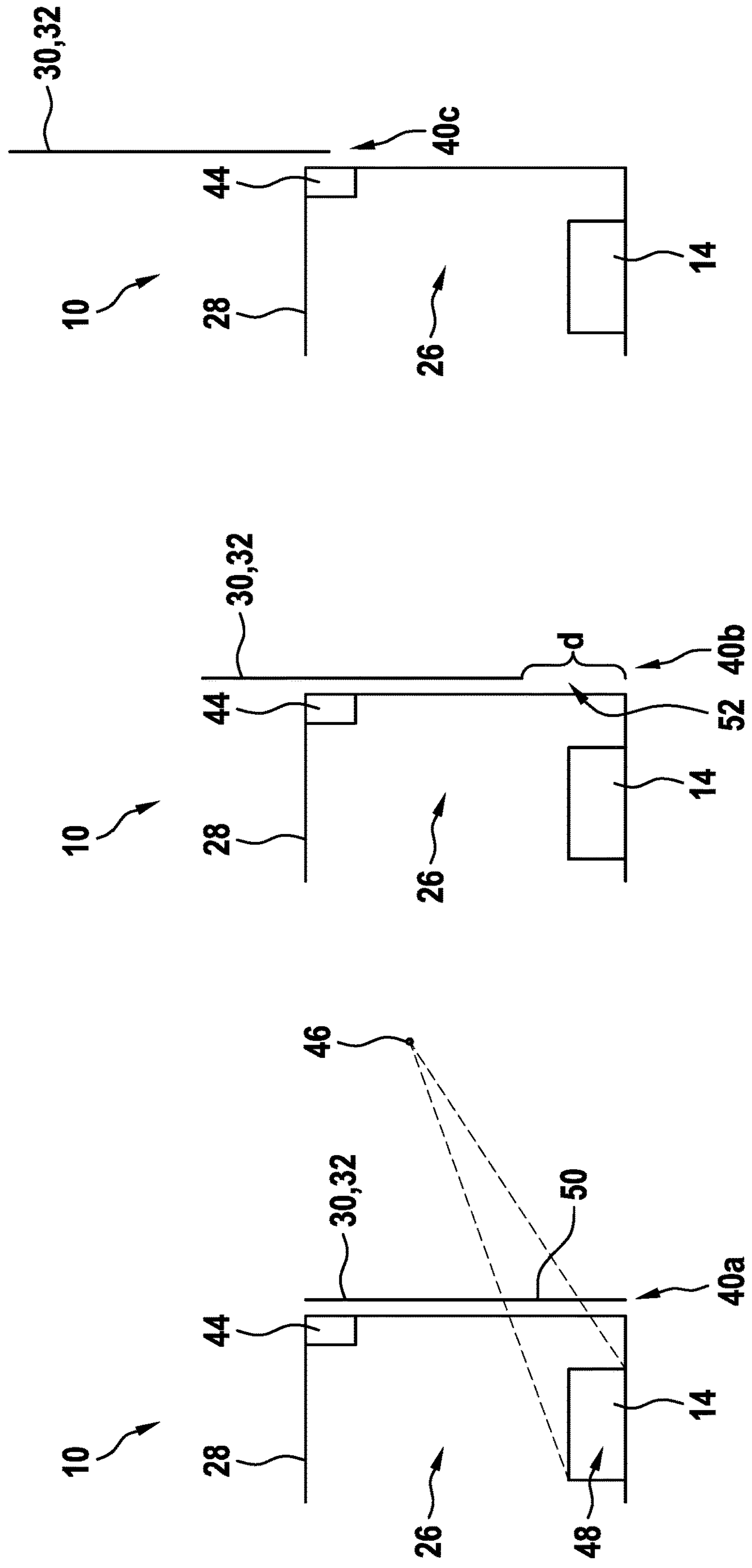
FIGS. 3A, 3B and 3C show schematic cross-sectional views of a laboratory automation device according to a further embodiment of the invention.

FIGS. 3A, 3B and 3C show an embodiment of a laboratory automation device 10 with a sliding door 30. The door 30 of the laboratory automation device 10 of FIG. 1 may be designed in such a way. The sliding door 30 may prevent access to the workspace 26 in a first door position 40*a* (position "closed"), may allow access to the workspace 26 in a second door position 40*b* (position "work bench accessible"), and may allow access to the whole workspace 26 in a third door position 40*c* (position "completely opened"). Again, the display area 50 may be determined in dependence of the door position 40*a*, 40*b*. The sliding door may have different "work bench accessible" 40*b* positions varying in the height d of the assessing gap 52.

Figure 4:
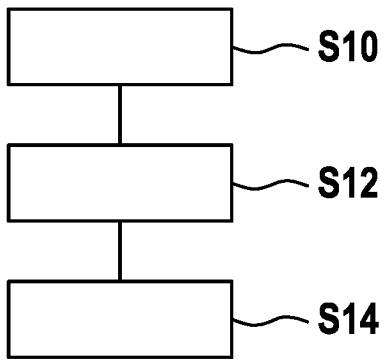
FIG. 4 shows a flow diagram illustrating a method for operating a laboratory automation device according to an embodiment of the invention.

FIG. 4 shows a flow diagram for a method for operating a laboratory automation device 10, such as shown in the previous figures.

In step S10, when more than one person 42 are in front of the door 30, a person 42 is selected. The controller 38 may determine how many persons are in front of the door 30, by evaluating the video stream of the camera 36*a*. The camera 36*a* may be arranged, such that its field of view is directed to an area in front of the door 30, where persons 42 are to be expected. A person 42 or the head of a person may be identified with object recognition.

It may be that a person 42 is selected via gesture detection performed with sensor data of the tracking sensor 36 and in particular the camera 36*a*. For example, a waving arm or a specific gesture may be determined with object recognition of the hand and/or arm and tracking its position.

It also may be that the person 42 is selected via the transparent display 32. The heads and/or faces of all persons 42 in the field of view of the camera 36*a* may be displayed on the transparent display 32, for example as stationary information 34*a*. The transparent display 32 may comprise a touchscreen and the person may be selected by touching the area with the respective stationary information 34*a*.

In step S12, the eye position 46 of the person 42 is determined from sensor data acquired with the tracking sensor 36. For example, the eye position 46 may be extracted from the image of the head of the person selected in step S10 or from a single person in front of the door 30. The eye position 46 may be determined via object recognition in the video stream from the camera 36*a*. It also may be that the infrared light sources 36*c* are used, which are reflected from the eye and which reflections may be identified in the video stream.

The eye position 46 may be a three-dimensional coordinate that is provided with respect to a coordinate system, in which also positions of points inside the workspace 26 may be calculated and/or in which also the position of the transparent display 32 is known.

In step S14, augmented reality information 34*b* for a notification area 48 in the workspace 26 is displayed on the transparent display 32.

The controller 38 determines one or more notification areas 48, for which information 34*b* should be displayed. The notification area 48 may be an area, in which a component 14 of the laboratory automation device 10 is situated. The information 34*b* may be a status information of the component 14, such as an error message or a message for the person to exchange or refill the component 14. It also may be that the notification area 48 is an empty area in the workspace 26. For example, an area in which a component 14 of the laboratory automation device 10 is to be placed by the person 42. The information 34*b* may be a status information of the component 14 to be placed.

The controller 38 may maintain an internal model of the workspace 26 and the components 14 inside. This model may provide information at which positions which components 14 are situated. The model also may provide information on a bounding volume of the components. Such bounding volumes may be used as notification area 48. The internal model may be updated, when a component 14 is put into the workspace 26 and removed from the workspace 26. The internal model may be updated, when a component 14 changes its place, for example due to the operation of the pipetting arm 20 and/or the gripper 24.

When the one or more notification areas 48 are determined, the notification areas 48 are projected towards the eye position 46 onto the transparent display 32 for determining a display area 50 on the transparent display 32. The transparent display 32 may be modelled as a rectangle, which position is determined by the position 40*a*, 40*b*, 40*c* of the door 30. The notification areas 48 may be projected onto this rectangle via central perspective with the eye position 46.

In the end, information 34*b*, which is shown in the respective display area 50, is rendered. The information 34*b* may comprise at least one of text, numbers, symbols, outlines, highlights, etc. It may be that the graphical information 34*b* is blinking or changes color to catch the interest of the person 42.

Due to the projection, the information 34*b* is displayed from a perspective of the person 42 in front of the notification area 48. In such a way, the person can identify easily, to which component 14 the information 34*b* belongs, in particular independently of the position 40*a*, 40*b* of the sliding door 30 (FIG. 3A-3C) or the opening angle of the hinged door 30 (FIG. 2).

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A laboratory automation device, comprising:

a workspace with liquid containers and a pipetting arm for moving a pipette between different positions and for aspirating and ejecting of liquid at these positions for moving liquids between the liquid containers;

a housing enclosing the workspace;

a door of the housing for accessing the workspace, wherein the door comprises a transparent display for displaying information and for allowing a person to view into the workspace, wherein the door comprises a position sensor for determining a position of the door;

a tracking sensor for tracking an eye position of the person;

a controller configured to:

determine the eye position of the person from sensor data acquired with the tracking sensor;

display information for a notification area in the workspace on the transparent display, such that the information is displayed from a perspective of the person in front of the notification area, wherein the perspective of the person is defined by the eye position;

determine a display area on the transparent display, in which the information is displayed in dependence of the position of the door; and project the notification area towards the eye position onto the transparent display for determining the display area using a three-dimensional model of the transparent display together with the position of the door.

2. The laboratory automation device according to claim 1, wherein the notification area is an area, in which a component of the laboratory automation device is situated;

wherein information, which is displayed on the transparent display, is a status information of the component.

3. The laboratory automation device according to claim 1, wherein the notification area is an area, in which a component of the laboratory automation device is to be placed;

wherein information, which is displayed on the transparent display, is a status information of the component to be placed.

4. The laboratory automation device according to claim 1, wherein the tracking sensor comprises a camera.

5. The laboratory automation device according to claim 1, wherein the tracking sensor comprises an eye tracking sensor.

6. The laboratory automation device according to claim 1, wherein the tracking sensor is adapted for determining that more than one person is in front of the door.

7. The laboratory automation device of claim 6, wherein the laboratory automation device is configured to select the person, for who the eye position is determined, is selected via gesture detection performed with sensor data of the tracking sensor.

8. The laboratory automation device according to claim 6, wherein the transparent display comprises a touchscreen, and wherein a picture of the person, for who the eye position is determined, is displayed on the transparent display and is touchable for selecting the person via the transparent display.

9. The laboratory automation device according to claim 1, wherein the door has a position sensor for determining a position of the door;

wherein a display area on the transparent display, in which the information is displayed, is determined in dependence of the position of the door.

10. The laboratory automation device according to claim 1, wherein the transparent display comprises a touchscreen.

11. A method for operating a laboratory automation device, the method comprising:

determining an eye position of a person from sensor data acquired with a tracking sensor;

displaying information for a notification area in a workspace on a transparent display, such that the information is displayed from a perspective of the person in front of the notification area, determining a display area on the transparent display, in which the information is displayed, in dependence of the position of a door comprising the transparent display;

projecting the notification area towards the eye position onto the transparent display for determining the display area using a three-dimensional model of the transparent display together with the position of the door, wherein the workspace is enclosed with a housing and comprises liquid containers and a pipetting arm for moving a pipette between different positions and for aspirating and ejecting of liquid at these positions for moving liquids between the liquid containers, wherein the housing comprises a door of the housing for accessing the workspace, wherein the door comprises the transparent display for displaying information and for allowing the person to view into the workspace, and wherein the door comprises a position sensor for determining the position of the door.

12. A computer program for a controller of a laboratory automation device, which, when being executed by a processor, is adapted for performing the method of claim 11.

13. A non-transitory computer-readable medium, in which a computer program according to claim 12 is stored.

* * * * *